(12) United States Patent
Bugaj et al.

(10) Patent No.: US 8,624,898 B1
(45) Date of Patent: Jan. 7, 2014

(54) TYPED DEPENDENCY GRAPHS

(75) Inventors: Stephan Bugaj, San Pablo, CA (US);
Brett Levin, San Francisco, CA (US);
Joshua Minor, El Cerrito, CA (US)

(73) Assignee: Pixar, Emeryville, CA (US)

( * ) Notice: Subject to any disclaimer, the term of this patent is extended or adjusted under 35 U.S.C. 154(b) by 1168 days.

(21) Appl. No.: 12/400,158

(22) Filed: Mar. 9, 2009

(51) Int. Cl.
*G06T 11/20* (2006.01)
*G06F 17/30* (2006.01)
*G06F 7/00* (2006.01)
*G06T 13/00* (2011.01)

(52) U.S. Cl.
USPC ............ 345/440; 345/418; 345/473; 707/805

(58) Field of Classification Search
USPC .................................................. 345/440, 473
See application file for complete search history.

(56) References Cited

U.S. PATENT DOCUMENTS

| | | | |
|---|---|---|---|
| 4,809,170 | A | 2/1989 | Leblang et al. |
| 4,912,637 | A | 3/1990 | Sheedy et al. |
| 5,504,879 | A | 4/1996 | Eisenberg et al. |
| 5,649,200 | A | 7/1997 | Leblang et al. |
| 5,706,510 | A | 1/1998 | Burgoon |
| 5,752,244 | A | 5/1998 | Rose et al. |
| 5,764,980 | A | 6/1998 | Davis et al. |
| 5,890,166 | A | 3/1999 | Eisenberg et al. |
| 5,930,797 | A | 7/1999 | Hill |
| 5,974,428 | A | 10/1999 | Gerard et al. |
| 5,995,107 | A | 11/1999 | Berteig et al. |
| 6,058,397 | A | 5/2000 | Barrus et al. |
| 6,112,024 | A | 8/2000 | Almond et al. |
| 6,119,130 | A | 9/2000 | Nguyen et al. |
| 6,181,336 | B1 | 1/2001 | Chiu et al. |
| 6,243,706 | B1 | 6/2001 | Moreau et al. |
| 6,278,466 | B1 | 8/2001 | Chen |
| 6,313,837 | B1 | 11/2001 | Assa et al. |
| 6,348,921 | B1 | 2/2002 | Zhao et al. |
| 6,353,437 | B1 | 3/2002 | Gagne |
| 6,362,817 | B1 | 3/2002 | Powers et al. |
| 6,400,372 | B1 | 6/2002 | Gossweiler, III et al. |
| 6,411,990 | B1 | 6/2002 | Shaffer et al. |
| 6,557,012 | B1 | 4/2003 | Arun et al. |
| 6,559,845 | B1 | 5/2003 | Harvill et al. |
| 6,573,898 | B1 | 6/2003 | Mathur et al. |
| 6,611,262 | B1 | 8/2003 | Suzuki |
| 6,615,204 | B1 | 9/2003 | Menon |

(Continued)

OTHER PUBLICATIONS

Notice of Allowance, U.S. Appl. No. 10/977,346, dated Jun. 21, 2010.

(Continued)

*Primary Examiner* — Ke Xiao
*Assistant Examiner* — Jed-Justin Imperial
(74) *Attorney, Agent, or Firm* — Patterson +Sheridan, LLP

(57) ABSTRACT

Typed dependency graphs represent digital assets as nodes in a graph. The digital assets, data files, and required software applications are represented as connected nodes. Nodes of the graph are connected by typed links, specifying the type of dependency relationship between digital assets, data files, and/or software applications associated with nodes. Type attributes can represent one-way dependencies, two-way dependencies, version relationships, variant relationships, subcomponent relationships, aggregation relationships, and software application/digital asset dependencies. Typed dependency graphs may be automatically created by parsing asset data or data files to determine the characteristics of assets and their relationships with other assets, data files, and software applications. Typed dependency graphs may be traversed based on the type of links, with the result defining a component, subcomponent, version, and/or variant.

23 Claims, 12 Drawing Sheets

(56) References Cited

U.S. PATENT DOCUMENTS

| | | | |
|---|---|---|---|
| 6,628,286 B1 | 9/2003 | Comair et al. | |
| 6,704,739 B2 | 3/2004 | Craft et al. | |
| 6,731,279 B2 | 5/2004 | Suzuki et al. | |
| 6,828,971 B2 | 12/2004 | Uesaki et al. | |
| 6,850,572 B2 | 2/2005 | Kim et al. | |
| 6,867,782 B2 * | 3/2005 | Gaudette et al. | 345/530 |
| 6,924,821 B2 * | 8/2005 | Trinh et al. | 345/629 |
| 7,123,814 B2 | 10/2006 | David | |
| 7,123,816 B2 | 10/2006 | McGrath et al. | |
| 7,127,501 B1 | 10/2006 | Beir et al. | |
| 7,159,212 B2 | 1/2007 | Schenk et al. | |
| 7,287,029 B1 | 10/2007 | Craft et al. | |
| 7,463,264 B2 | 12/2008 | Harrison et al. | |
| 2002/0091868 A1 | 7/2002 | Molnar | |
| 2002/0156984 A1 | 10/2002 | Padovano | |
| 2004/0003370 A1 | 1/2004 | Schenk et al. | |
| 2004/0012641 A1 | 1/2004 | Gauthier | |
| 2004/0128556 A1 | 7/2004 | Burnett | |
| 2004/0199627 A1 * | 10/2004 | Frietsch | 709/224 |
| 2004/0243597 A1 | 12/2004 | Jensen et al. | |
| 2005/0005242 A1 | 1/2005 | Hoyle | |
| 2005/0091603 A1 | 4/2005 | Chen et al. | |
| 2005/0134591 A1 | 6/2005 | Baxter | |
| 2005/0253839 A1 * | 11/2005 | Bugaj et al. | 345/418 |
| 2005/0253848 A1 * | 11/2005 | Bugaj et al. | 345/473 |
| 2005/0256881 A1 | 11/2005 | Harrison et al. | |
| 2006/0010153 A1 * | 1/2006 | Bugaj | 707/102 |
| 2006/0015431 A1 * | 1/2006 | Bugaj et al. | 705/35 |
| 2006/0259386 A1 | 11/2006 | Knowlton et al. | |

OTHER PUBLICATIONS

Final Office Action, U.S. Appl. No. 10/977,346, dated Mar. 8, 2010.
Office Action, U.S. Appl. No. 10/977,346, dated Jul. 21, 2009.
Office Action, U.S. Appl. No. 10/982,190, dated Jun. 26, 2008.
Final Office Action, U.S. Appl. No. 10/982,190, dated Jun. 11, 2007.
Office Action, U.S. Appl. No. 10/982,190, dated Oct. 10, 2006.
Cook et al., "The Reyes Image Rendering Architecture", Computer Graphics, vol. 21, No. 4, 1987, pp. 95-102.
International Search Report PCT/US04/026131 dated Sep. 18, 2006.

* cited by examiner

TYPED DEPENDENCY GRAPHS

CROSS-REFERENCES TO RELATED APPLICATIONS

This application is related to U.S. patent application Ser. No. 10/977,346 filed on Oct. 28, 2004, now U.S. Pat. No. 7,821,516, U.S. patent application Ser. No. 10/982,190 filed on Nov. 5, 2004, now U.S. Pat. No. 7,683,904, and PCT Patent Application PCT/US2004/026131 filed on Aug. 11, 2004, which are incorporated by reference herein for all purposes.

BACKGROUND

The present invention relates to methods and systems for managing complex digital assets. Computer generated animations are often generated by creating data representing objects and their associated shading, texturing, and animation rigging characteristics. The objects are assembled into one or more shots each representing a specific sequence of animation. A shot typically includes one or more objects, a camera specifying a viewpoint, and lighting. A shot also includes animation data specifying the movement or other changes over time of objects, the camera, and lighting. Data for each of these aspects of a shot is a digital asset that can stored in one or more files.

A renderer or other software program processes the digital assets defining shots, cameras, lighting, animation, objects, shading, texturing, animation rigging, animation data, and any other associated data, such as simulation data, to create one or more computer generated images or animated sequences. Many renderers create computer generated images and animations by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time.

Digital assets have complex dependencies with each other. For example, the geometric features of a character model can be specified by a geometry data file. The texturing and shading attributes of the character model can be specified by one or more texture and shading program and data files. To render the character model correctly, the renderer must combine the data from these separate files. Additionally, digital assets can have complex dependencies with software applications. For example, a character model can use a modeling application to create and manipulate its geometry data, a texturing and shading application to manipulate texturing and shading programs and data, and an animation rigging application to create animation rigging, which translates animation data, referred to as animation variables, into changes in the geometry and other aspects of a character model.

The relationships between digital assets is further complicated in that digital assets and their associated software applications evolve over the course of a production. As digital assets and software tools evolve, older dependencies may be broken. For example, a character model can use a first version of geometry data and a first version of texturing data. Some portions of the animated feature may be created using the first versions of the geometry and texturing data. As the production continues, a new texturing software application may be used to create a second version of the texturing data, for example to refine attributes of the character model. It may be possible for new shots of the animated feature to freely use the new texturing data with the first version of the geometry data; however, previously completed shots should continue to use the first version of the texturing data to avoid the possibility of the new texturing data altering or even ruining the previously completed shots.

As digital assets and their associated software applications evolve, the potential for introducing incompatibilities increases dramatically. For large productions, there may be animators working with one version of a digital asset while technical staff are creating a revised version of a digital asset. Furthermore, previously completed portions of the production may require the use of older versions of the digital asset. If the wrong version of a digital asset is used, a visual discontinuity, or a "pop," can be introduced if the new object looks different from the old one in the various scenes. Alternatively, the inclusion of a new version of an object in an older scene may cause the renderer to terminate with an error. Even worse, during the time which one frame takes to render, it is possible for different users to install new versions of one or more assets (e.g. objects to be rendered) referenced in the frame. As a result, errors and visual discontinuities can occur within a single shot. Furthermore, it is very common for images or shots to need to be re-worked after being approved to make them ready for "film-out." However, if versions of the assets that were used in older shots have been updated, it is extremely difficult to re-render or replicate exactly the same images.

Tracking the dependencies between digital assets, software tools, and associated portions of the production is an arduous task. Previously, these dependencies were maintained manually using source-code and document control software applications. Users were required to check files in and out of predefined packages or collections. Each package or collection contained a compatible set of digital assets that could be referenced together. In this prior system, only relatively simple types of dependencies, such as "asset is a member of a group," can be represented.

In these prior systems, dependencies between digital assets and specific versions of software tools, dependencies between digital assets and shots, and multiple types of dependency relationships for each digital asset are difficult if not impossible to represent with this system. Furthermore, this system is error prone, relying upon users to select the correct package or collection. Additionally, it is difficult to track the complete state of a set of dependent assets, to track changes in sets of dependent assets, and to debug dependency problems.

It is therefore desirable for a system and method to enable the creation and maintenance of complex dependency relationships between digital assets and associated software tools. It is further desirable for the system and method to allow any number of dependency relationships between any number of digital assets and associated software tools in arbitrary locations. It is also desirable for the system and method to be readily adaptable to a wide variety of types of digital assets and software tool applications. It is further desirable for the system and method to enable a set of multiple digital assets to be automatically accessed as a single aggregate asset according to its associated dependency relationships. It is also desirable for the system and method to support multiple versions of digital assets and aggregate assets. It is further desirable for the system and method to facilitate access to different versions of digital assets and aggregate assets, and where necessary maintain dependencies with specific versions of digital assets for compatibility. It is desirable for the system and method to enable the analysis of the complete state of a set of dependent assets, to enable the tracking of changes in sets of dependent assets, and to enable the debugging of dependency problems.

BRIEF SUMMARY

An embodiment of the invention maintains dependency information between digital assets and software application tools by creating typed dependency graphs. The typed dependency graph represents each digital asset as a node in a graph. Related digital assets are connected by links in the graph. The data files associated with the digital asset are represented as additional connected nodes. Software application tools are also represented as nodes in the graph. Software application nodes are connected with nodes representing associated digital assets and/or their data files. Each node in the graph can include information identifying its corresponding digital asset, data file, or software application, such as the location of the digital asset, the type of the digital asset, and other information.

In an additional embodiment, different versions of a digital asset can be represented in the graph as separate nodes. Nodes representing different versions of the digital asset can be connected with a node representing all versions of the digital asset. In an additional embodiment, nodes of the graph can represent aggregations of two or more digital assets. For example, an aggregate asset can be created representing an object and connected with the nodes representing the digital assets making up the aggregate asset.

In an embodiment, nodes of the graph are connected by links. In an embodiment, links include type attributes specifying the type of dependency relationship between nodes. Type attributes can represent one-way dependencies, two-way dependencies, version relationships, aggregation relationships, and tool/digital asset dependencies.

An embodiment of the invention automatically creates typed dependency graphs. One or more parser modules can be used to process asset data or data files to determine the characteristics of assets and their relationships with other assets, data files, and software applications. Graph update policies can be defined to determine the frequency of updates to the typed dependency graph following changes to assets. Typed dependency graphs can be compared with the list of assets loaded for events to detect potential errors and to optimize the processing of assets.

An embodiment of the invention allows specific combinations of assets to be locked or grouped together into higher-level aggregate assets. These aggregate assets can be used to avoid compatibility problems with changing assets and ensure that shots or sequences can be replicated as the assets in a production evolve. As the assets within the aggregate asset are modified, additional versions of the aggregate asset can automatically be created. The versions of an aggregate asset can be manually or automatically assigned labels indicating their function or role in a digital production.

For example, the most recent version of an aggregate asset can be automatically assigned the label of "latest" to indicate that it is the most recent version of the asset. A version of the aggregate asset may also be automatically or manually labeled as "stable," indicating that it is the most recent version of the aggregate asset that is suitable for use in a production. Users and developers can define additional labels for any purpose. Moreover, users and developers can specify criteria for automatically applying and updating the labels associated with aggregate assets. Additionally, users can manually apply, update, or remove labels associated with aggregate assets.

As the development of new versions of aggregate assets progress, the asset creators may determine that a newer version of the aggregate asset is suitable for production use. The asset creators may then direct the system to transfer the label of "stable" to the newer version of the asset. Users can refer or reference aggregate assets according to their labels. For example, a shot can be constructed with reference to the "stable" version of the aggregate asset. When this label is transferred to a different version of an aggregate asset, the usage of that aggregate asset in this shot will automatically be updated to reference the version of the aggregate asset newly labeled as stable.

The automatic update of references to assets can be overridden through the use of "pins." When a reference to an asset is pinned, the current version of the aggregate asset associated with this reference is determined. The pinned reference will then remained fixed to this version of the aggregated asset, even if the label initially used to reference the aggregated asset is moved to a different version.

BRIEF DESCRIPTION OF THE DRAWINGS

The invention will be described with reference to the drawings, in which.

In the drawings, identical components are labeled with identical reference numbers.

DETAILED DESCRIPTION

Figure 1:
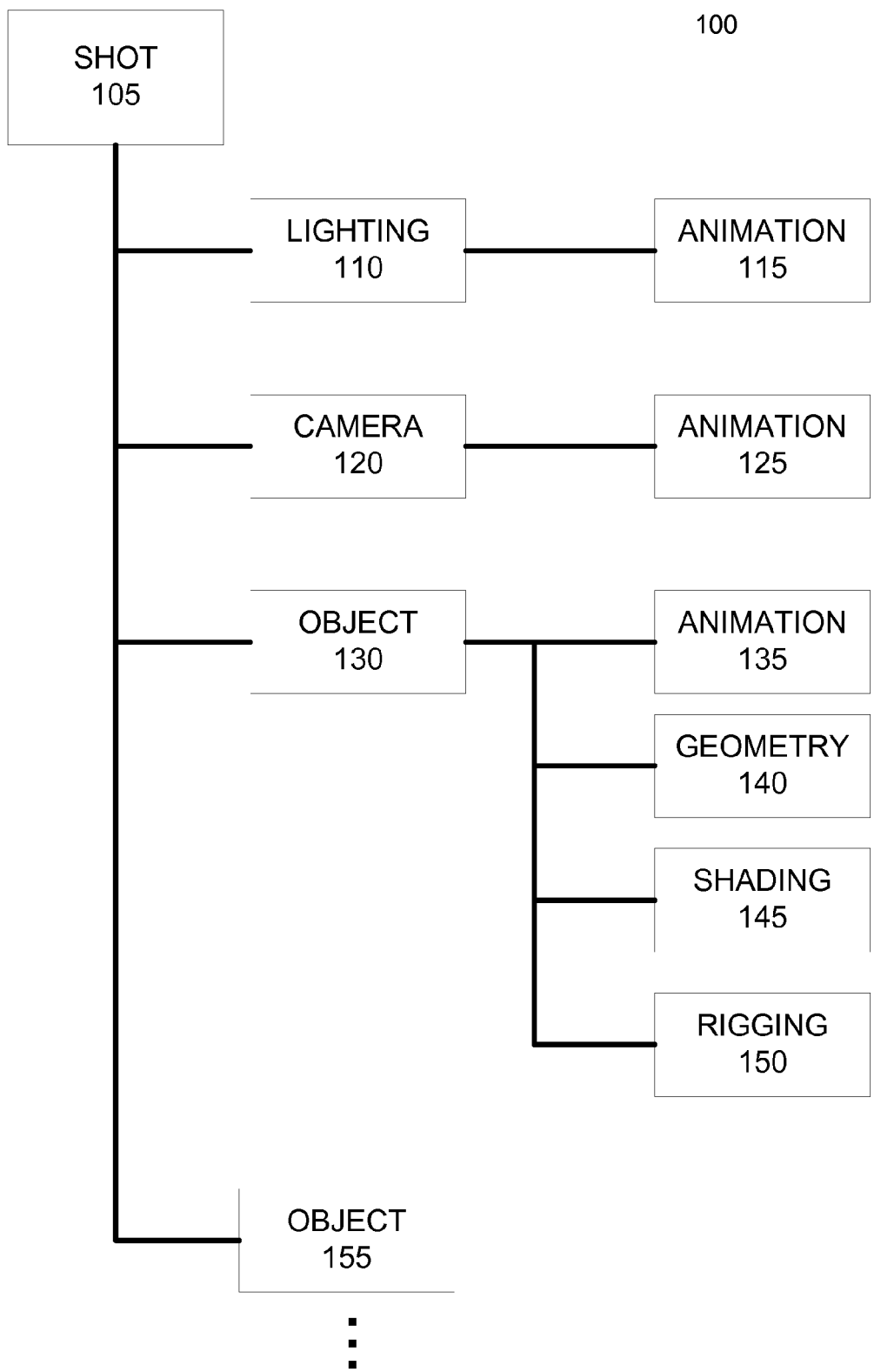
FIG. 1 illustrates an example logical dependency relationship between digital assets.

FIG. 1 illustrates an example logical dependency relationship 100 between digital assets. Logical dependency relationship includes a shot 105 specifying an image or animated sequence to be created. Shot 105 may be one of many shots within a production. In this example, shot 105 includes lighting data 110, which specifies the attributes of one or more lights. Additionally, animation data 115 specifies the values at any given time for the attributes of the lights specified by lighting data 110, which can include attributes such as the position, color, direction, and intensity of the lights.

Camera data 120 specifies the attributes of one or more cameras in the shot 105. Each camera represents a viewpoint from which one or more images of the shot 105 can be generated by a renderer. Animation data 125 specifies the values at any given time for the attributes of cameras associated with the shot 105. These attributes can include the position and orientation of a camera as well as optical properties such as the shutter time and focal length of a camera.

In this example, shot 105 can include one or more objects, such as example objects 130 and 155. Example object 130 includes geometry data 140 specifying at least the basic geometric features of the object 130. Shading programs and data 145 specifies the optical properties of the object 130, such as colors, textures, transparency, reflectivity, and other more complex properties. The position, orientation, pose, and other attributes of the object 130 at any given time are specified by animation data 135 and rigging data 150. Animation data 135 specifies the attributes of the object 130 in terms of animation variables or avars. The rigging data 150 specifies how animation software applications translate the values of animation variables into specific changes in the geometric features, optical properties, and other attributes of the object 130.

Example object 155 and any other objects in shot 105 can include similar types of data as example object 130.

Figure 2:
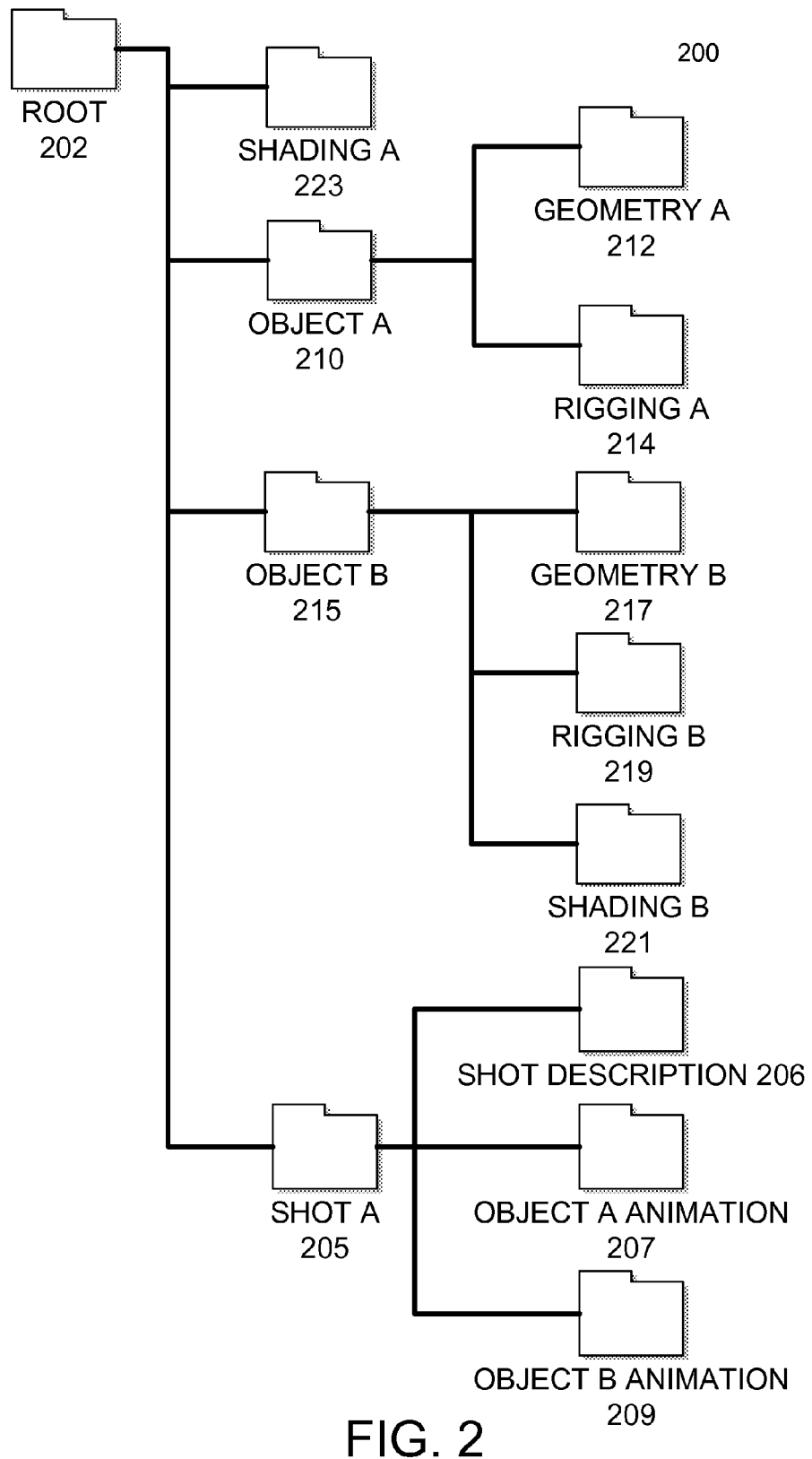
FIG. 2 illustrates an example set of data files associated with digital assets.

FIG. 2 illustrates an example set of data files 200 associated with digital assets. A typical shot is specified by a number of different users and includes on the order of gigabytes of data. To facilitate production and reuse of digital assets, the data for the shot is dispersed in a number of smaller data files. Generally, logical assets, such as shots, objects, and the like are themselves composed of a number of separate digital assets in separate data files.

In this example, the set of data files 200 are arranged in a file system hierarchy having a root location 202. In this example, the set of data files 200 are located at absolute or relative storage locations, such as at specific computer disk directories, at specific network directories, with specific file names or aliases, or the like. However, in other embodiments, databases or other asset management software may be used to implement a data storage hierarchy for the set of data files 200.

The set of data files includes a shot A directory 205. The shot A directory includes a shot description file 206. The shot description file 206 may be associated with only one frame to be rendered, sequence of images, a portion of a production, or with the entire feature. An example shot description file 206 can include references to a camera, lights, and objects A and B. In this example, shot A directory 205 includes animation data files 207 and 209 specifying animation data for objects A and B in the shot.

Object A directory 210 includes a geometry data file 212 and a rigging data file 214. Geometry data file 212 specifies the geometric features of object A. The geometric features can be specified in a number of ways, from abstract features such as the number of wheels on a car object to specific features attributes such as control points defining surfaces. A rigging data file 214 specifies rigging data used to translate the values of animation variables into specific changes in the geometric features, optical properties, and other attributes of the object 130. Object A can also use shading data stored in data files in shading A directory 223.

Similarly, object B directory 215 includes a geometry data file 217 and a rigging data file 219. In this example, the shading data for object B is stored in shading B data file 221.

The arrangement of the set of data files 200 illustrates some of the complexities associated with managing dependent digital assets used in digital film and animation production. In this example, dependent digital assets can be located in separate data files. Data files can be in the same directory, in sub-directories, or in parallel directories. Further complications can arise when multiple versions of a digital asset are used. Additionally, this file system hierarchy does not maintain any dependencies between data files associated with digital assets and different versions of software tools.

Figure 3:
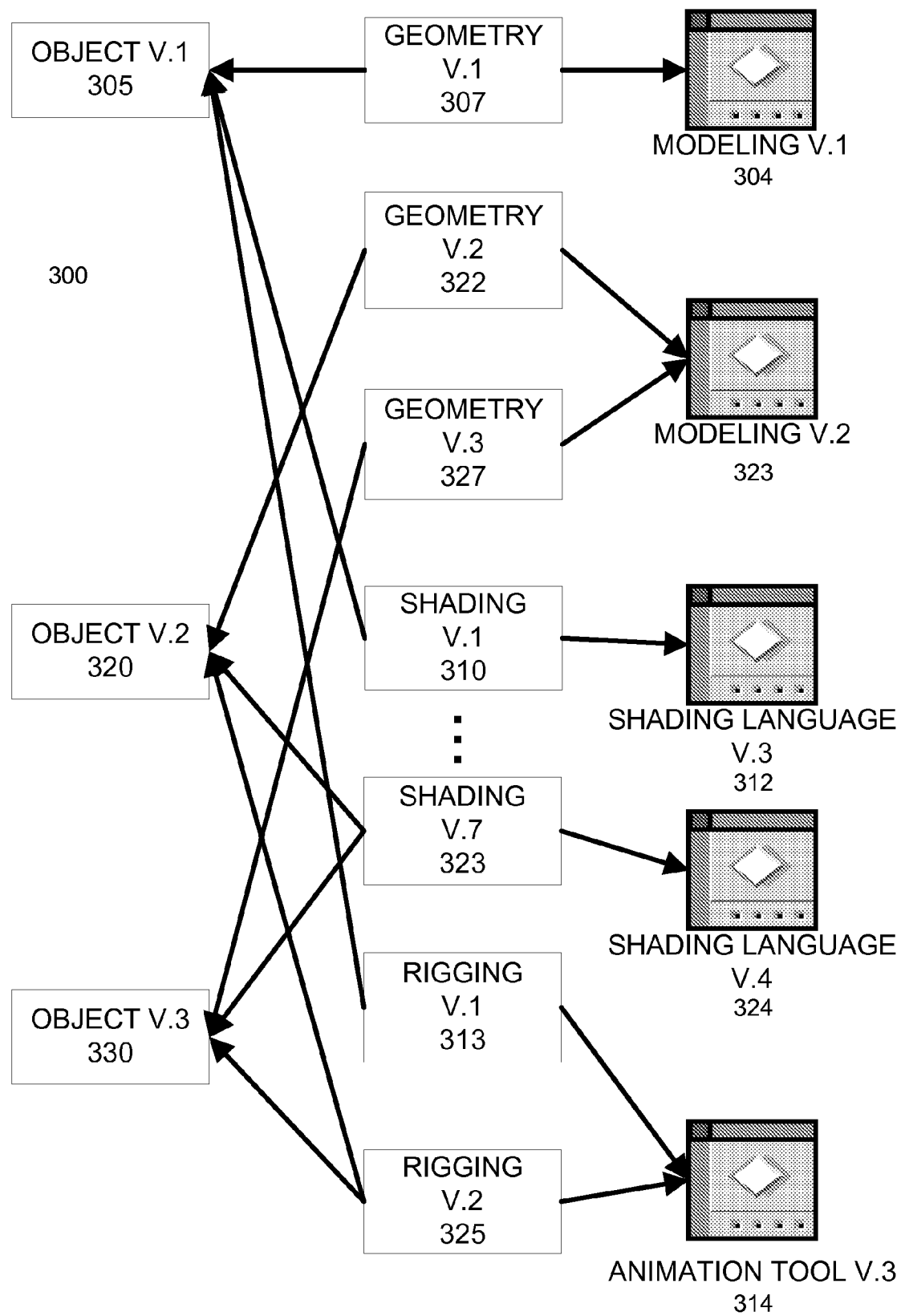
FIG. 3 illustrates an example set of dependencies between digital assets and software tools.

FIG. 3 illustrates an example set of dependencies 300 between digital assets and software tools. Version 1 of an object, referred to as object v.1 305, uses geometry data v.1 307, which must be manipulated with modeling software application v.1 309. Object v.1 305 also uses shading data v.1 310, which requires shading language v.3 312, and rigging data v.1 313, which requires animation software tool v. 3, 314.

In contrast, version 2 of this object, object v.2 320, uses geometry data v.2 322, which requires modeling software application v.2 323; shading data v.7 323, which requires shading language v.4 324; and rigging data v.2 325, which requires animation software tool v.3 314. Version 3 of the object, object v. 3 330, uses geometry data v.3 327, which requires modeling software application v.2 323; shading data v.7 323, which requires shading language v.4 324; and rigging data v.2 325, which requires animation software tool v.3 314.

As can be seen in example set of dependencies 300, any combination of versions of digital assets can be required for a version of an object or other entity. Furthermore, each version of a digital asset can be dependent on a specific version of a software application. As a result, numerous versions of a digital asset and associated tool must be maintained in order to ensure compatibility.

An embodiment of the invention maintains dependency information between digital assets and software application tools by creating typed dependency graphs. The typed dependency graph represents each digital asset as a node in a graph. Related digital assets are connected by links in the graph. The data files associated with the digital asset are represented as additional connected nodes. Software application tools are also represented as nodes in the graph. Software application nodes are connected with nodes representing associated digital assets and/or their data files. Each node in the graph can include information identifying its corresponding digital asset, data file, or software application, such as the location of the digital asset, the type of the digital asset, and other information.

In an additional embodiment, different versions of a digital asset can be represented in the graph as separate nodes. Nodes representing different versions of the digital asset can be connected with a node representing all versions of the digital asset. In an additional embodiment, nodes of the graph can represent aggregations of two or more digital assets. For example, an aggregate asset can be created representing an object and connected with the nodes representing the digital assets making up the aggregate asset.

In an embodiment, nodes of the graph are connected by links. In an embodiment, links include type attributes specifying the type of dependency relationship between nodes. Type attributes can represent one-way dependencies, two-way dependencies, version relationships, variant relationships, subcomponent relationships, aggregation relationships, and tool/digital asset dependencies.

Figure 4A:
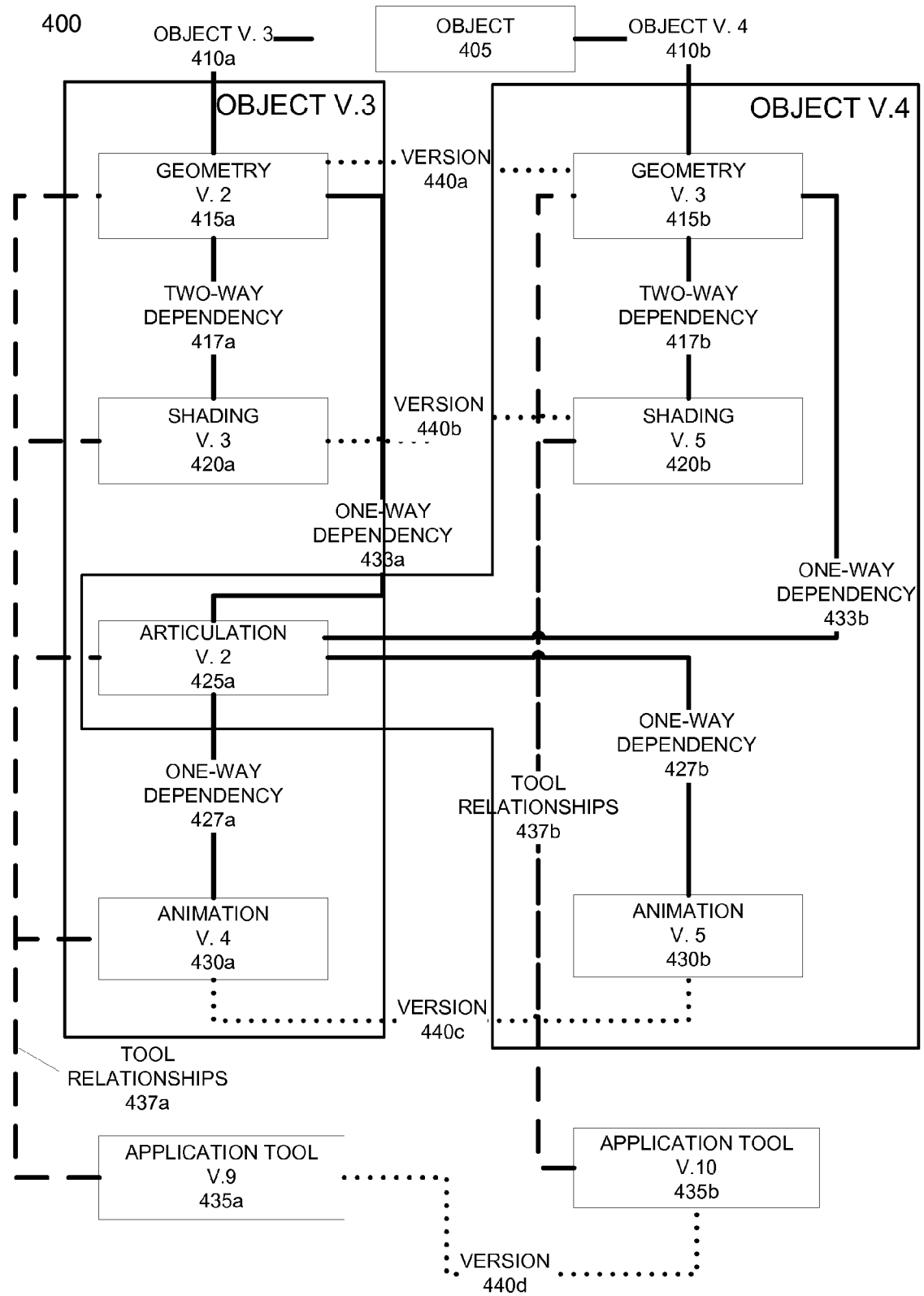
FIGS. 4A-4B illustrate an example typed dependency graph and typed dependency graph queries capable of being implemented by an embodiment of the invention.

FIG. 4A illustrates an example typed dependency graph 400 capable of being implemented by an embodiment of the invention. Typed dependency graph 400 includes a root node 405 representing an object or other component. Root node 405 is connected via aggregation graph link 410a to geometry node 415a, representing version 2 of a geometry digital asset. In this example, aggregation graph link 410a represents the graph nodes, and hence the digital assets, comprising version 3 of an object.

Geometry node 415a is associated with shading node 420a, representing version 3 of a shading digital asset, via two-way dependency graph link 417a. Additionally, geometry node 415a is associated with articulation node 425a, representing version 2 of an articulation digital asset, via one-way dependency graph link 433a. Articulation graph node 425a is associated via one-way dependency graph link 427a with animation graph node 430a, representing version 4 of an animation digital asset.

In addition to aggregation and dependency types of graph links, example typed dependency graph 400 includes tool/digital asset dependency graph links representing the appropriate software applications or tools to be used with digital assets. In example 400, tool relationships 437a associate a software tool application graph node 435a, representing version 9 of a software application or tool, with graph nodes 415a, 420a, 425a, and 430a, indicating that this version of the software application should be used to access or modify the digital assets associated with these graph nodes. Example 400 includes all of the nodes of version 3 of the object associated with a single software tool application graph node, and thus with a single software application or tool, for the purposes of illustration; however, in many applications, there may be multiple software applications, and thus many different software tool application graph nodes, associated with the digital assets included in an object.

Example typed dependency graph 400 includes multiple versions of both an aggregate object or component and multiple versions of the associated digital assets. Root node 405 is connected via aggregation graph link 410b to geometry node 415b, representing version 3 of a geometry digital asset. In this example, aggregation graph link 410b represents the graph nodes, and hence the digital assets, comprising version 4 of the object.

Geometry node 415b is associated with shading node 420b, representing version 5 of a shading digital asset, via two-way dependency graph link 417b. Additionally, geometry node 415b is associated with articulation node 425a, representing version 2 of an articulation digital asset, via one-way dependency graph link 433b. Articulation graph node 425a is associated via one-way dependency graph link 427b with animation graph node 430b, representing version 5 of an animation digital asset.

In addition to aggregation and dependency types of graph links, example typed dependency graph 400 includes tool/digital asset dependency graph links representing the appropriate software applications or tools to be used with digital assets. In example 400, tool relationships 437b associate a software tool application graph node 435b, representing version 10 of a software application or tool, with graph nodes 415b, 420b, and 430b, indicating that this version of the software application should be used to access or modify the digital assets associated with these graph nodes.

As shown in example 400, a digital asset may be shared among multiple versions of the same object or component. For example, both versions 3 and 4 of the object include one-way dependency graph links 433 with articulation node 425a, representing version 2 of an articulation digital asset.

In a further embodiment, example typed dependency graph 400 can include version graph links, indicating related versions of a digital asset. For example geometry nodes 415a and 415b, representing versions 2 and 3 of a geometry digital asset, are associated via version graph link 440a. Similarly, geometry nodes 420a and 420b, representing versions 3 and 5 of a shading digital asset, are associated via version graph link 440b; animation nodes 430a and 430b, representing versions 4 and 5 of an animation digital asset, are associated via version graph link 440c; and application nodes 435a and 435b, representing versions 9 and 10 of an application, are associated via version graph link 440d.

The example typed dependency graph 400 is intended for purposes of illustration and embodiments of the invention may include simpler or more complex typed dependency graphs with any arbitrary number of graph nodes and graph links, as well as any arbitrary graph topology.

Figure 4B:
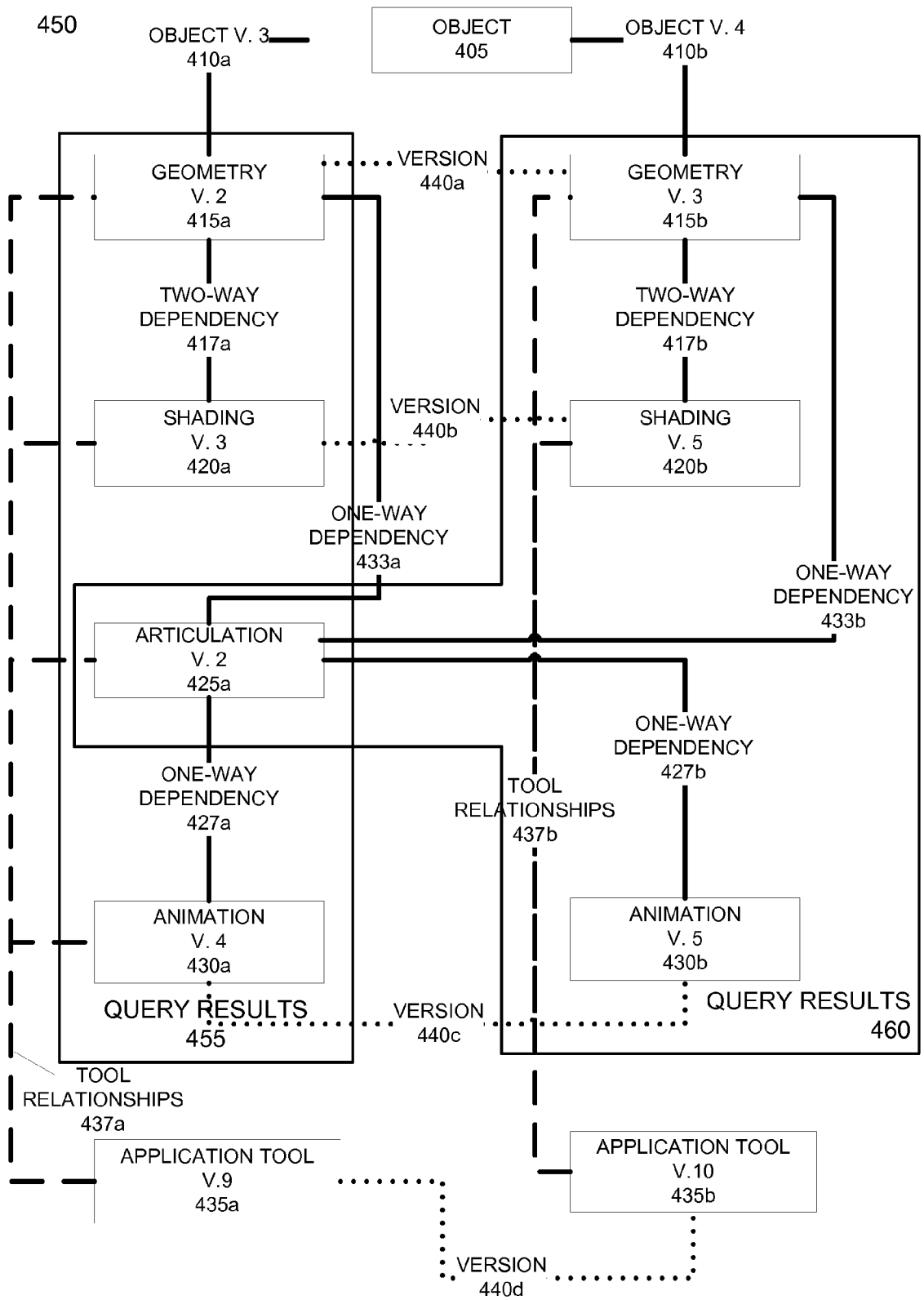

In an embodiment, users and applications may perform queries based on one or more graph link types. For example, FIG. 4B illustrates example results 450 from two example link type queries applied to the example typed dependency graph 400 described in FIG. 4A, according to an embodiment of the invention.

For example, a user or application may query a typed dependency graph based on a single link type and optionally one or more graph nodes. An example of this type of typed dependency graph query may include determining all of the digital assets having a tool relationship with version 9 of a software application or tool, corresponding with software tool application graph node 435a. In FIG. 4B, the results of this example query are shown inside box 455 and include geometry version 2 415a, shading version 3 420a, articulation version 2 425a, and animation version 4 430a.

In another example, a user or application may query a typed dependency graph based on multiple link types and optionally one or more graph nodes. An example of this type of typed dependency graph query may include determining all of the digital assets having a one-way or two-way dependency relationship with version 3 of the geometry, corresponding with graph node 415b. In FIG. 4B, the results of this example query are shown inside box 460 and include shading version 5 420b, articulation version 2 425a, and animation version 5 430b.

Figure 5:
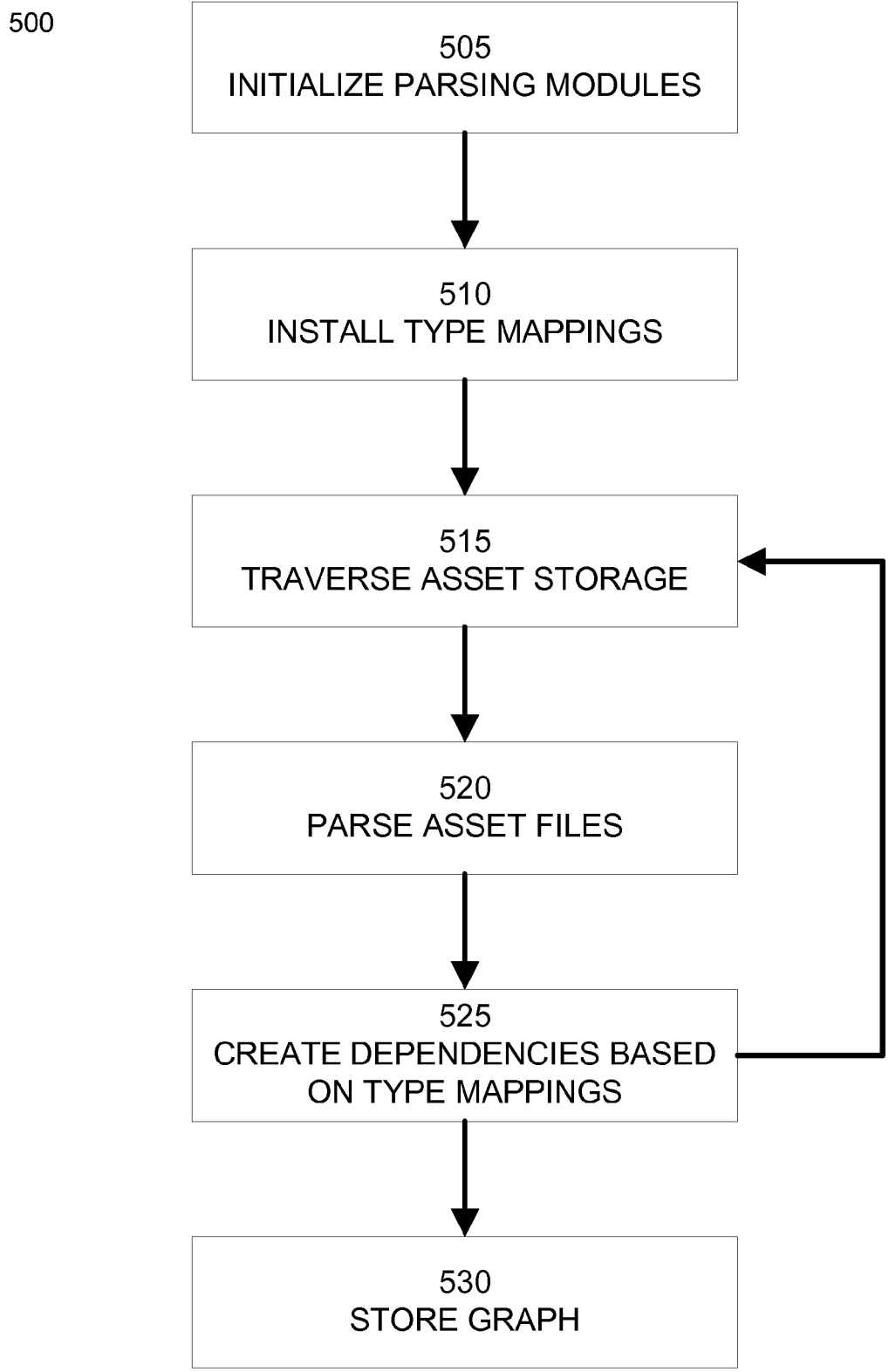
FIG. 5 illustrates a method of creating a dependency graph specifying dependency relationships associated with digital assets and software tools according to an embodiment of the invention.

FIG. 5 illustrates a method 500 of creating a dependency graph specifying dependency relationships associated with digital assets and software tools according to an embodiment of the invention. Step 505 initializes one or more parsing modules for analyzing data files containing digital assets. In an embodiment, parsing modules are software modules adapted to analyze digital assets to determine dependency relationships between two or more digital assets. Parsing modules can be created as needed by system users to integrate different types of digital assets into the system.

In an embodiment, a parsing module can be specified with a data file prefix or suffix pattern and an associated data asset type. A data file including the prefix or suffix in its name will be added to the typed dependency graph with the specified prefix or suffix. In further embodiments, a parsing module is a stand-alone or dynamically loaded software module that includes a parser adapted to read a data file and/or its surrounding file system structure to identify one or more digital assets and any associated dependency relationships.

Step 510 defines type mappings to be used by the parsing modules to import digital assets into a dependency graph. In an embodiment, one or more type mappings are specified for each parsing module by a system user. In an embodiment, type mappings include reference-based mapping, structure-based mappings, and tool-based mappings. The parsing modules use reference-based type mappings to analyze the contents of a data file to identify one or more digital assets defined within the data file and to determine dependency relationships between the identified digital assets and other digital assets within the data file or located in other data files. For example, a data file can include definitions of one or more digital assets and dependency relationships. By analyzing the contents of the data file, a parsing module can identify digital assets and associated dependencies.

The parsing modules identify structure-based type mappings based on the storage locations of data files in a file system hierarchy or database storage tree. The parsing modules use structure-based type mappings when data files corresponding with digital assets are stored in a hierarchical file system arrangement and the dependency relationships between digital assets can be deduced from data files' storage locations in the hierarchy. For example, a digital asset defined in a first data file stored in a parent directory can be dependent upon a digital asset defined in a second data file stored in a sub-directory. By analyzing the storage locations of digital assets, a parsing module can identify the digital assets and associated dependencies.

The parsing modules use tool-based type mappings to define dependencies between digital assets and software tool applications. In an embodiment, the parsing modules apply tool-based type mappings to digital assets identifying using reference-based and structure-based type mappings to define dependencies between these digital assets and one or more software tool applications. Software tool applications can be software applications used to create or modify a digital asset or to utilize the digital asset. In an embodiment, the system can include parsing modules to analyze the source and/or object code of software tool applications. This can be used to track different versions of the software tool applications and enable the recreation of any version of the software tool applications as needed to handle dependent digital assets. In an embodiment, software code called by digital assets, for example simulation programs or shading programs, can be treated by the parsing modules as a dependent digital asset or as a software tool application.

Step 515 traverses the digital asset storage to identify digital assets and their associated dependency relationships. In an embodiment, step 515 recursively traverses the file system hierarchy or database storage tree starting at a root directory or asset. At each level of the hierarchy, all of the data files and digital assets are added to a traversal queue representing assets to be analyzed.

Step 520 uses the parsing modules to analyze each data file or digital asset in the traversal queue. The parsing modules create graph nodes for the assets in the traversal queue.

Step 525 creates dependency relationships between graph nodes based upon type mappings. In an embodiment, parsing modules first analyze data files associated with a digital asset to identify any reference-based type mappings. If the parsing modules identify explicit or implicit references to other digital assets within the data files associated with a digital asset, the parsing modules create links between the corresponding graph nodes of the appropriate type. In a further embodiment, if parsing modules identify references to additional digital assets that are not part of the graph or in the traversal queue, the parsing module adds these additional assets to the traversal queue.

Following the identification of reference-based type mappings, an embodiment of step 525 uses parsing modules to identify structure-based type mappings. In this embodiment, the storage locations of data files associated with digital assets are compared with each other to determine dependency relationships. For example, a digital asset defined in a first data file stored in a parent directory can be assumed to be dependent upon a digital asset defined in a second data file stored in a sub-directory. As a result, embodiments of parsing modules can create links between the corresponding graph nodes of the appropriate type.

Following the application of reference-based and structure-based type mappings, step 525 applies tool-based type mappings to the identified digital assets. Using the tool-based type mappings, the parsing modules determine an asset type for a digital asset. Based on the asset type, one or more associated software tools can be identified. The parsing modules then create links of the appropriate type between graph nodes corresponding with the digital asset and its associated software tools. In an embodiment, as a digital asset is first processed, the links between the digital asset and an associated software tool are created to reference the current version of the software tool. If the software tool is updated to a new version, the link to prior version of the software tool is maintained to ensure compatibility.

In a further embodiment, the source code files of a software tool are integrated into the typed dependency graph. In the typed dependency graph, the source code files and their dependencies are represented as nodes and links. Digital assets linked to a version of the software tool are linked to the nodes representing the source code for that version. As the source code for a software tool is updated, new nodes representing the updated source code files are created. However, the unmodified source code files and corresponding nodes and links are maintained as necessary for compatibility with any associated digital assets.

Following step 525, an embodiment of method 500 returns to step 515 to traverse any remaining portions of the digital asset storage. Steps 515 through 525 can be repeated as necessary to identify and analyze all of the digital assets and associated software tools currently in use.

Once graph nodes and links have been created for all of the digital assets and associated software tools, step 530 stores the complete typed dependency graph. The typed dependency graph can be stored as one or more data files or in a database system.

Figure 6:
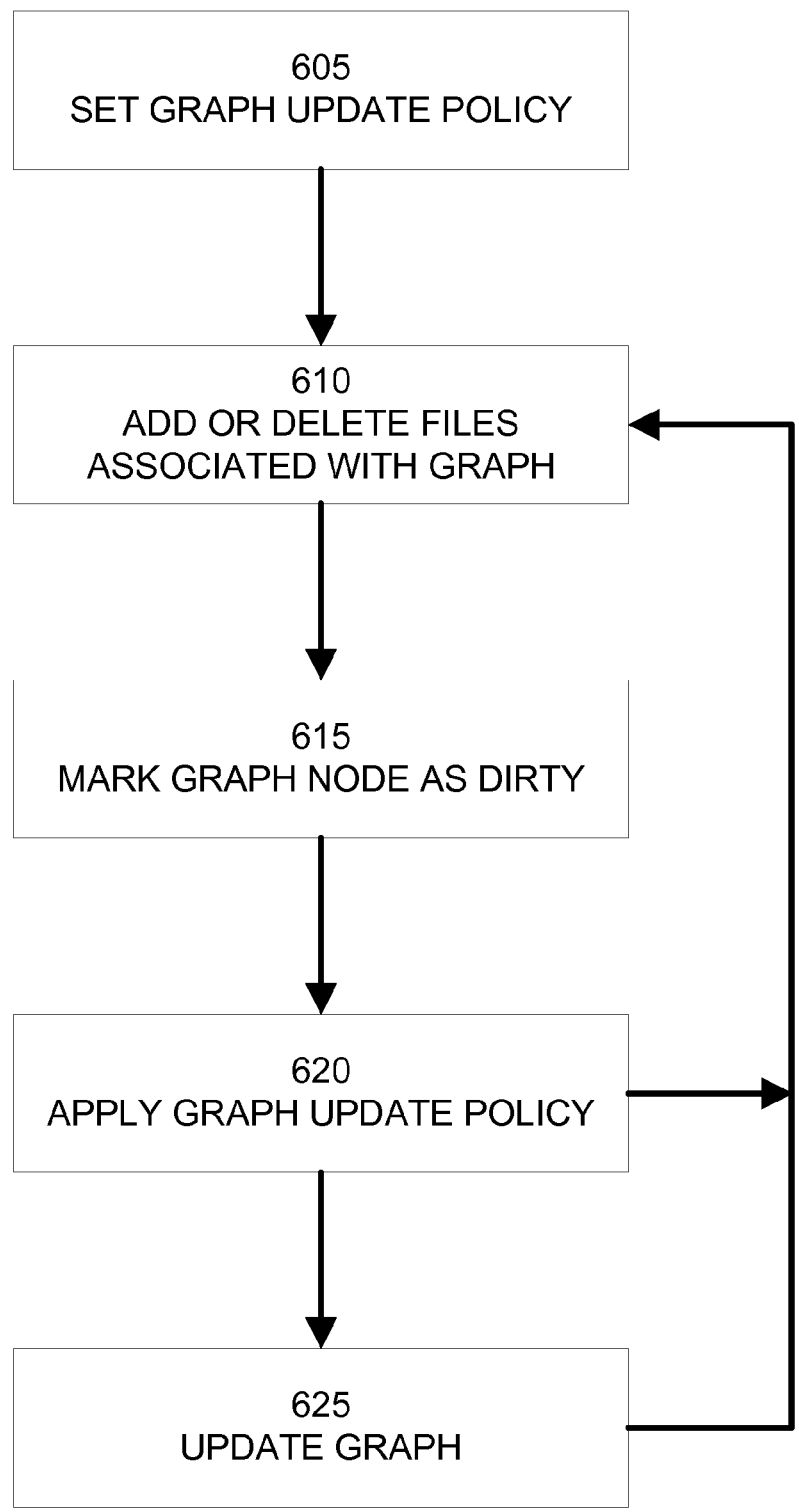
FIG. 6 illustrates a method of adding or removing digital assets from a dependency graph according to an embodiment of the invention.

As digital assets are added, removed, or updated, the typed dependency graph is updated. FIG. 6 illustrates a method 600 of adding or removing digital assets from a dependency graph according to an embodiment of the invention. In step 605, a graph update policy is set by a user. In some applications, updating the dependency graph is very time consuming if many changes have been made. Thus, to improve the responsiveness of the system and reduce computation time, an embodiment of method 600 supports a number of different graph update policies. For example, a graph update policy can specify that the dependency graph is to be updated immediately following any change; according to a predetermined schedule; when a predetermined number or proportion of nodes have been added, removed, or modified; when a specified user or software application attempts to access the dependency graph or a digital asset associated with a modified node; and/or upon the occurrence of a specified event. In a further embodiment, the dependency graph system is interfaced with an asset versioning system. In this embodiment, the graph update policy can specify that the dependency graph is to be updated when a new version of a digital asset or software tool is created.

Step 610 receives additions, deletions, or other updates of files or assets. Files or assets can be provided by the user or by automated processes. For each deleted or modified file or asset, step 615 marks the corresponding node in the dependency graph as "dirty." For added files, step 615 creates a new corresponding node and marks it as dirty. Assets are marked as dirty to indicate to the system that dependencies between this asset and the other assets need to be determined.

Step 620 applies the graph update policy as specified in step 605. If the graph update policy is satisfied, method 600 proceeds to step 625 to update the graph. Otherwise, method 600 proceeds back to step 610 to await the receipt of additional added, deleted, or modified files.

In an embodiment, step 625 updates the typed dependency graph using the method 500 discussed above. In a further embodiment, step 625 performs a modified version of method 500. In this embodiment, only the nodes that are marked dirty are initially traversed and parsed to update dependency graph. If the updates to the dependency graph affect other nodes, then these affected nodes are also marked as dirty and traversed as well.

In still a further embodiment of step 625, filters can be specified to omit nodes from the graph update based on the dependency type, the dependency weight, the age of the dependency, the file or asset type or age, or any other criteria of the file or asset or of the dependency graph itself.

Figure 7:
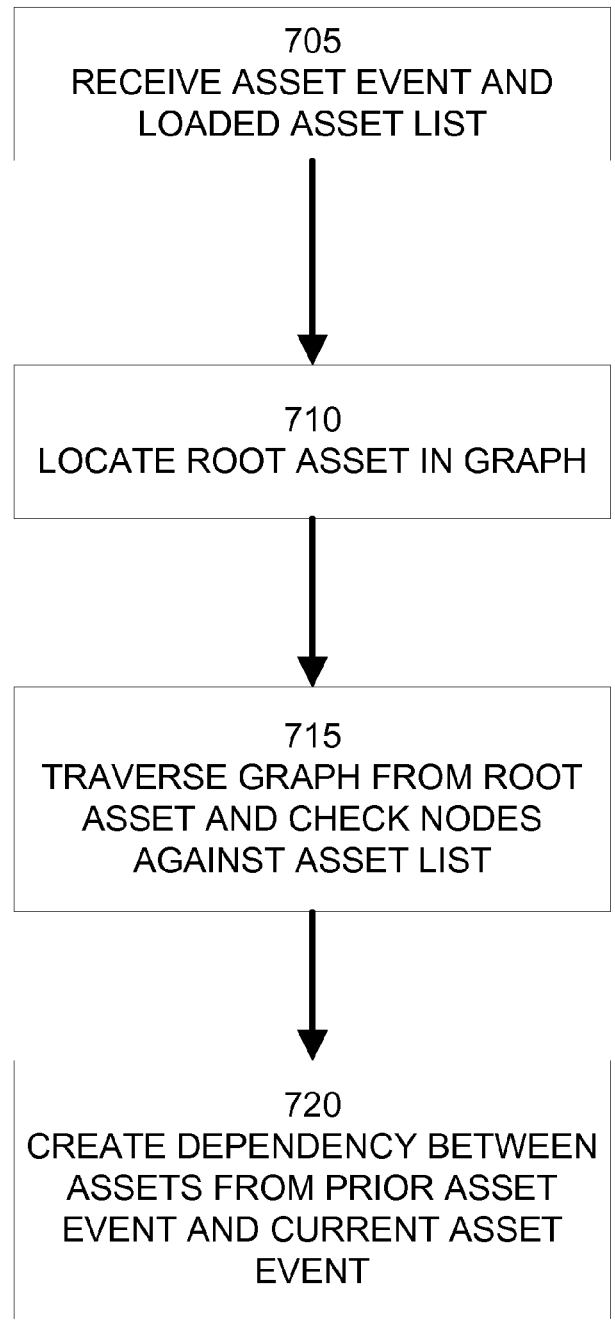
FIG. 7 illustrates a method of accessing digital assets associated with a dependency graph according to an embodiment of the invention.

FIG. 7 illustrates a method 700 of accessing digital assets associated with a dependency graph according to an embodiment of the invention. Assets can be accessed in a variety of contexts. Events such as building, compiling or installing assets; rendering; or other user-defined events may require a complete set of interdependent assets to be loaded and processed as a group. Method 700 enables access to a complete set of digital assets required for these events.

Step 705 receives an asset event indicator and a loaded asset list. The asset event indicator informs the system that an asset event, such as building, compiling or installing assets; rendering; or other user-defined events, has been initiated. The loaded asset list is a list of assets previously loaded for a previous instance of this event. The list of loaded assets can be generated upon completion of a previous instance of an event to specify the complete set of assets used during the event.

Step 710 locates the root asset in the dependency graph corresponding with this event. Typically, the root asset is the shot or scene being processed by the event.

Step 715 traverses the graph from the root node through all of its dependent nodes. For each traversed node, step 715 compares the asset associated with the node with the corresponding asset on the list of loaded assets.

Step 720 creates a dependency for each asset loaded in the previous event and its corresponding asset in the current event.

Following method 700, the resulting dependency relationships between assets in events can be used in a number of ways. Assets that were missed by the dependency analyzer but loaded during an event can be detected and added to the dependency graph. Additionally, administrators can use this information to debug or optimize the dependency analyzer and associated parsers to ensure that the dependency analysis is neither over-inclusive or under-inclusive.

In addition to maintaining a typed dependency graph of assets, an embodiment of the invention allows specific combinations of assets to be locked or grouped together into higher-level aggregate assets. These aggregate assets can be used to avoid compatibility problems with changing assets and ensure that shots or sequences can be replicated as the assets in a production evolve.

Figure 8:
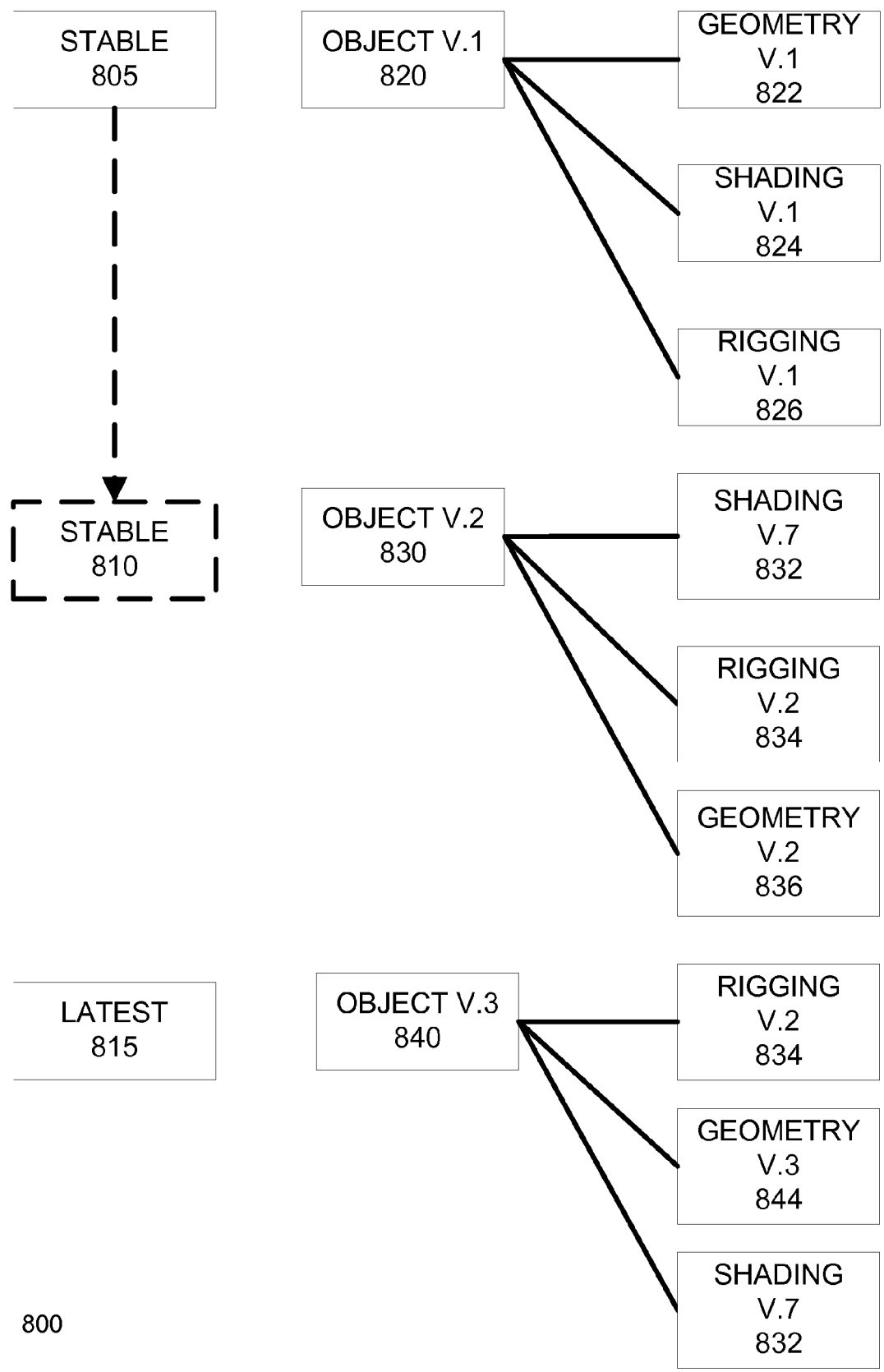
FIG. 8 illustrates example versions of an aggregate asset and associated labels capable of being implemented by an embodiment of the invention.

FIG. 8 illustrates example versions of an aggregate asset 800 and associated labels capable of being implemented by an embodiment of the invention. An aggregate asset is defined as any group of two or more files or digital assets. Regardless of the number of assets included in an aggregate asset, an embodiment of the invention can treat the aggregate asset as a single distinct entity. In an embodiment, different versions of an aggregate asset can be created manually or automatically as the assets within the aggregate asset are modified.

For example, aggregate asset of an object can include geometry, shading and rigging assets. In this example, a first version of the aggregate asset is object v.1 820 and includes a first version of a geometry asset, geometry v.1 822, a first version of a shading asset, shading v.1 824, and a first version of a rigging asset, rigging v.1 826.

As the assets within the aggregate asset are modified, additional versions of the aggregate asset can automatically be created. For example, a second version of the aggregate asset is object v.2 830 and includes a second version of a geometry asset, geometry v.2 836, a seventh version of a shading asset, shading v.7 832, and a second version of a rigging asset, rigging v.2 834. In this example, it can be seen that the assets within an aggregate asset do not have to be fixed as the same version.

Similarly, a third version of the aggregate asset is object v.3 840 and includes a third version of a geometry asset, geometry v.3 844, the seventh version of a shading asset, shading v.7 832, and the second version of a rigging asset, rigging v.2 834. In this example, it can be seen that the assets within an aggregate asset can be reused in multiple versions of the same aggregate asset, such as the rigging asset 834 and shading asset 832. as the same version Additionally, the versions of an aggregate asset can be manually or automatically assigned labels indicating their function or role in a digital production. For example, the most recent version of an aggregate asset can be automatically assigned the label of "latest" to indicate that it is the most recent version of the asset. In this example, the third version of the aggregate asset object v.3 840 is assigned the label of "latest" 815. Users such as technical directors, modelers, riggers, and texture and shading artists that are involved in the creation or development of assets will often need to work with the aggregate asset labeled as latest. In an embodiment, the system can automatically assign the label of "latest" upon the automatic or manual creation of a newer version of an aggregate asset.

In addition, a version of the aggregate asset can be labeled as "stable," indicating that it is the most recent version of the aggregate asset that is suitable for use in a production. In this example, the first version of the aggregate asset object v.1 820 may be assigned a label of stable 805. Users such as animators, lighting designers, and set designers may typically use the aggregate asset labeled as stable to create shots and scenes.

Users and developers can define additional labels for any purpose. Moreover, users and developers can specify criteria for automatically applying and updating the labels associated with aggregate assets. Additionally, users can manually apply, update, or remove labels associated with aggregate assets.

In a further example, as the development of new versions of aggregate assets progress, the asset creators may determine that a newer version of the aggregate asset is suitable for production use. The asset creators may then direct the system to transfer the label of "stable" to the newer version of the asset. In this example, the label of stable is transferred from object v.1 820 to the newer version of this aggregate asset object v.2 830 upon the determination that this version of the aggregate asset is suitable for use in a production.

In an embodiment, users can refer or reference aggregate assets according to their labels. For example, a shot can be constructed with reference to the "stable" version of the aggregate asset. When this label is transferred to a different version of an aggregate asset, the usage of that aggregate asset in this shot will automatically be updated to reference the version of the aggregate asset currently labeled as stable. This automatic update can be overridden through the use of "pins," which are discussed in detail below.

Figure 9:
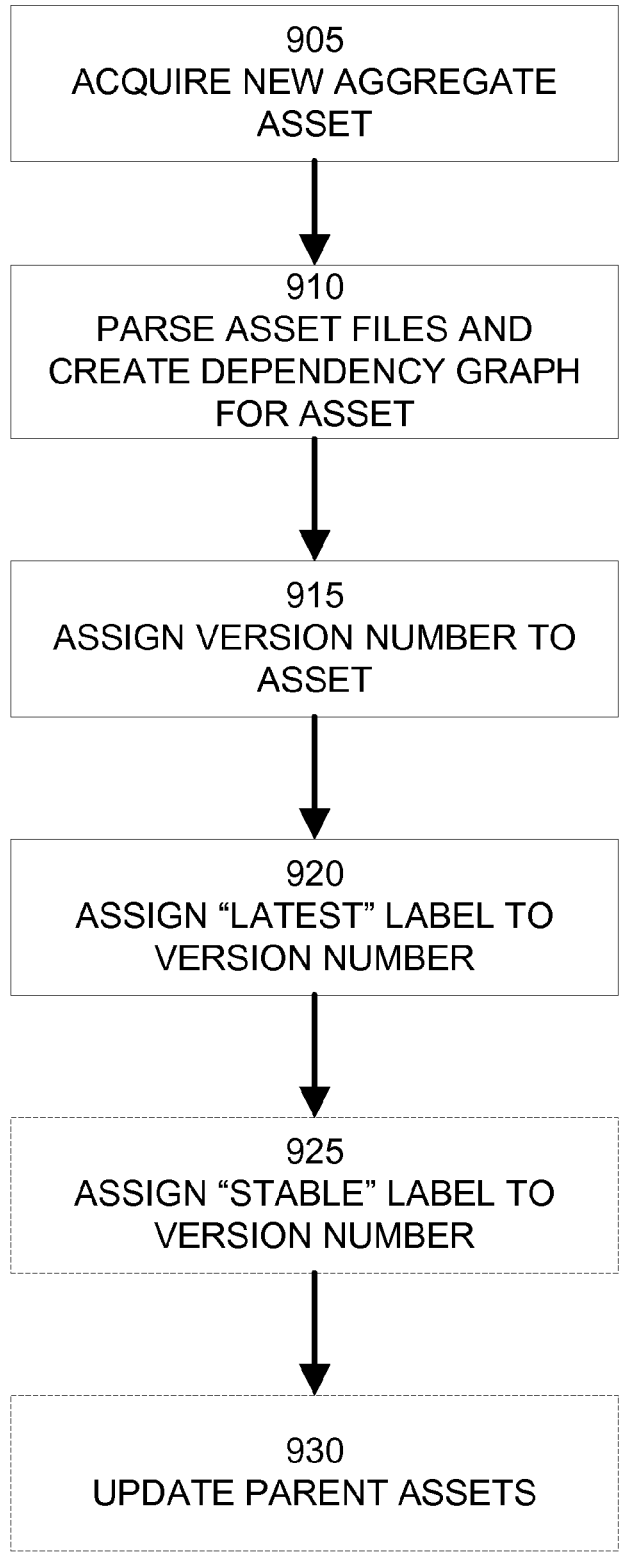
FIG. 9 illustrates a method of creating an initial version of an aggregate asset according to an embodiment of the invention.

FIG. 9 illustrates a method 900 of creating an initial version of an aggregate asset according to an embodiment of the invention. In step 905, a new asset is created, or an asset is entered into the change isolation system by a user. Step 910 parses the assets and/or associated asset files and creates a dependency graph for the aggregate asset. In an embodiment, step 905 processes assets according to method 500 discussed above.

Step 915 assigns a version number to the aggregate asset. If this is the first version of the aggregate asset, then the asset is assigned a version of 1. Step 920 assigns the label of "latest" to the aggregate asset to indicate that it is the most recent version of this aggregate asset. Optional step 925 may also assign the label of "stable" to this version of the aggregate asset. In an embodiment, step 925 is skipped, and the user can manually apply the label of "stable" to versions of aggregate assets after evaluation and/or testing.

In further embodiments, additional optional steps may evaluate criteria associated with the asset and to apply a user defined label to the asset if the criteria is satisfied.

Optional step 930 updates parent assets to the added aggregate asset. For example, if the added asset is a subset of a parent aggregate asset, then step 930 updates the parent aggregate asset to reference the newly added version of the aggregate asset. In an embodiment, step 930 updates the parent aggregate asset by updating its version number and optionally moving its associated labels, such as the parent aggregate asset's "latest" label. Step 930 may additionally update the dependency graph associated with the parent aggregate asset.

In an example, an animator may want to use the most recent stable version of an aggregate asset while creating a shot. In this circumstance, the animator may reference the aggregate asset in the shot using the "stable" label to ensure that the aggregate asset is automatically updated as new stable versions of the aggregate asset are completed.

However, in some circumstances, a user may want to ensure that the version of an aggregate asset used in a shot or scene is not changed when the aggregate asset is updated. For example, after an animator has finished a shot or scene, he or she may want to prevent further automatic updates to the aggregate asset to ensure that future versions of the aggregate asset do not "break" or alter completed scenes. To override the automatic updates associated with labels, users can "pin" or isolate a reference to an aggregated asset. When a reference to an aggregated asset is pinned, the current version of the aggregate asset associated with this reference is determined. The pinned reference will then remained fixed to this version of the aggregated asset, even if the label initially used to reference the aggregated asset is moved to a different version.

Figure 10:
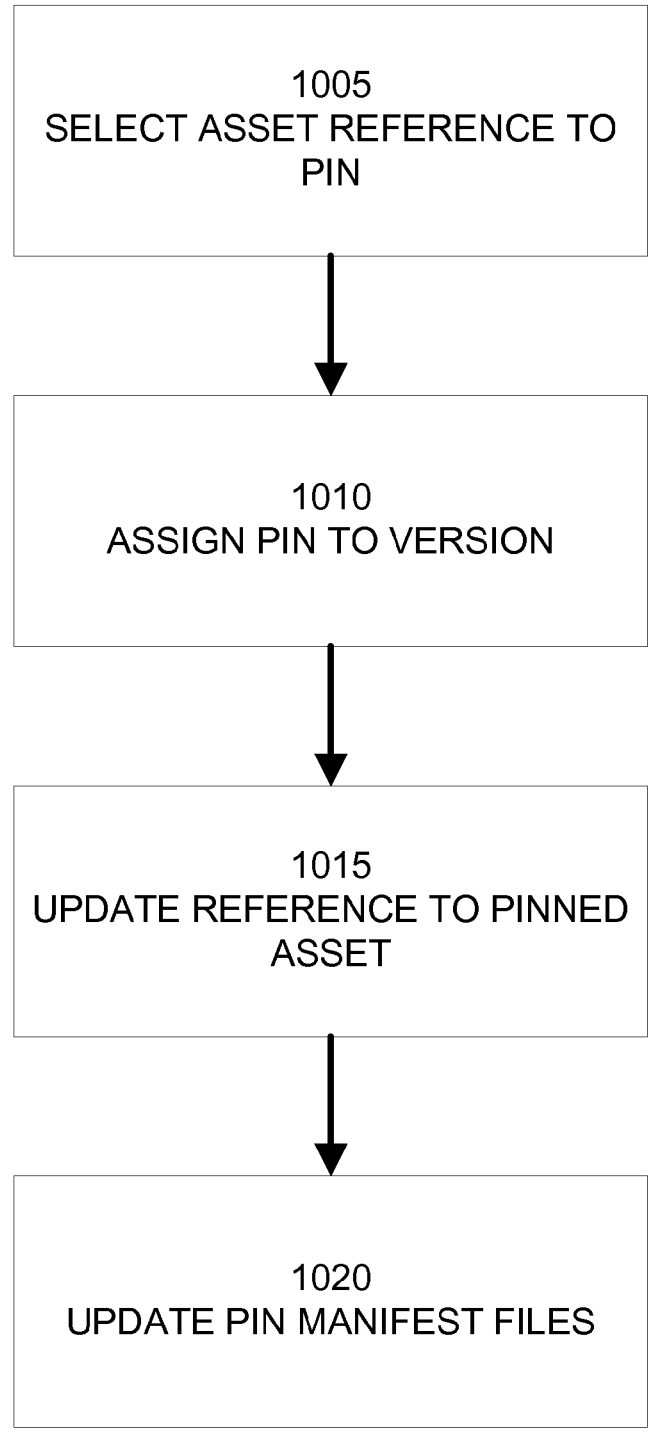
FIG. 10 illustrates a method of isolating an asset dependency for compatibility according to an embodiment of the invention.

FIG. 10 illustrates a method 1000 of isolating an asset dependency for compatibility according to an embodiment of the invention. Step 1005 receives the selection of a reference to an asset to pin or isolate from further changes. Step 1010 assigns the pin to the current version of the asset. Step 1015 updates the selected asset reference so that it points directly to the pinned asset, rather than to a label that may be moved. Step 1020 then updates one or more pin manifest files. The pin manifest files are used by the system to determine which references are using a given pinned asset. For example, a pin manifest file can be used to specify the asset or assets that are pinned, where the pinned assets are located or defined, and the user, shot, or other entity that is requesting the pinned asset. In an embodiment, there is a pin manifest file in each shot directory specifying all pins for the shot and a pin manifest file in each asset directory telling where asset has been pinned. The pin manifest files can be further used to determine if there are any references to a given version of an asset. If not, then that version of the asset may be deleted or archived if it is an older version of the aggregate asset.

Figure 11A:
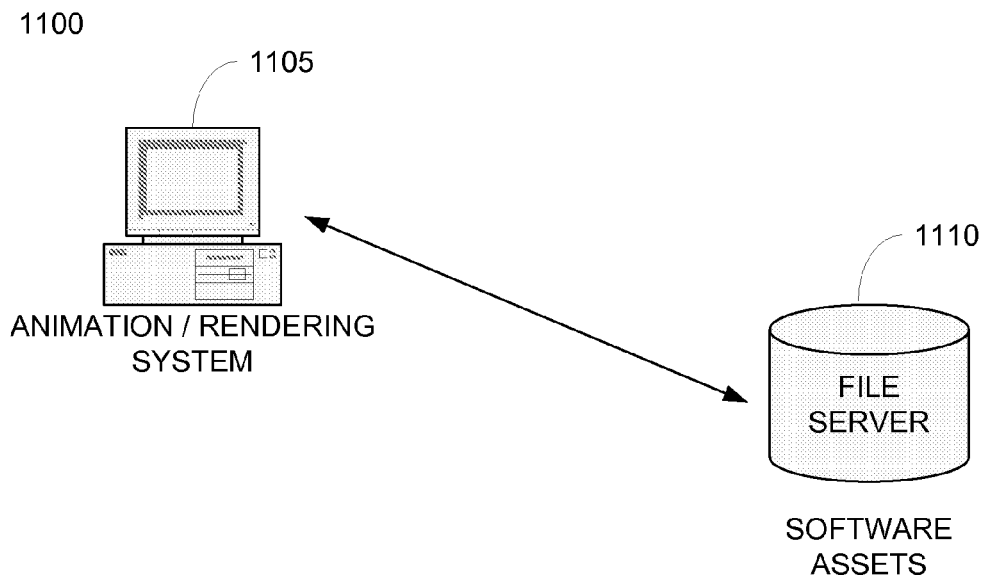
FIGS. 11A-11B illustrate example systems suitable for implementing an embodiment of the invention.
Figure 11B:
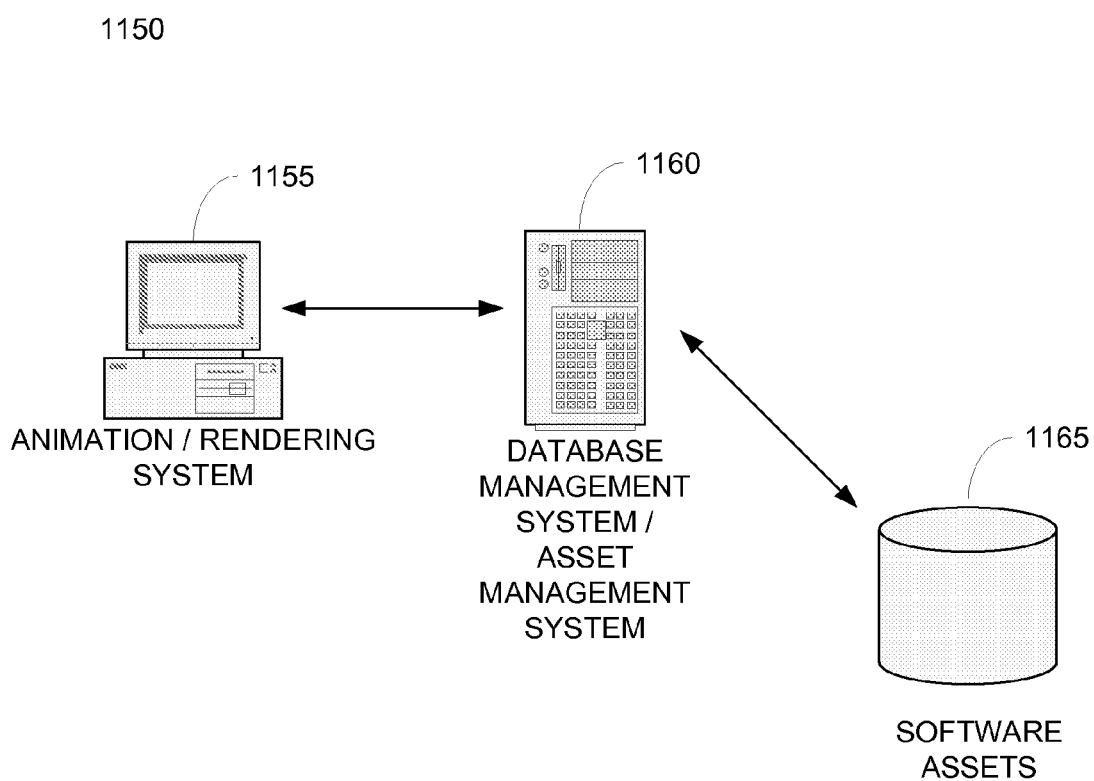

FIGS. 11A-11B illustrate example systems suitable for implementing an embodiment of the invention. FIG. 11A illustrates a computer system 1105 and a storage system 210.

In embodiments of the present invention, computer system 1105 renders a scene based upon a geometric description of a scene from storage system 1110. In embodiments of the invention, computer system 1105 may include one or more computer servers. Storage system 1110, may include any organized and repeatable way to access the assets including object models, lighting models, camera models, and the like. For example, in one embodiment, storage system 1110 includes a simple flat-directory structure on local drive or network drive, or the like. Additionally, locations of object models may be specified by absolute file path locations, relative file paths, aliases, and the like. In an embodiment, assets are stored in files. Each file can include one or more assets and/or each asset can be defined by one or more files. In further embodiments, symbolic links can be used to represent labels and references to assets.

FIG. 11B illustrates another embodiment of the present invention including a computer system coupled to a database. A computer system 155, a database management system (dbms) 1160, and a database 1165 are used to store and process assets. In embodiments of the invention, computer system 1155 may include one or more computer servers. Database management system 1160 and database 1165 can be a relational database or any other type of database system. In this embodiment, assets can be represented as database tables, database objects, files referenced by a database, or any other type of entity capable of being manipulated by a database.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of defining a component including a plurality of digital assets, the method comprising:
   receiving a component request specifying at least one requested graph link type;
   receiving a typed dependency graph representing digital assets, wherein the typed dependency graph includes graph nodes corresponding with the digital assets and includes typed graph links connecting the graph nodes, wherein each typed graph link includes one of a plurality of graph link types representing a type of digital asset relationship between at least two of the digital assets;

adding at least one of the graph nodes to a graph node processing set;

selecting and removing a first graph node from the graph node processing set;

comparing, by operation of one or more computer processors, at least a first typed graph link connected with the first graph node with the requested graph link type;

determining if a first graph link type included in the first typed graph link is consistent with the requested graph link type;

adding a second graph node connected with the first typed graph link to the graph node processing set in response to the determination that the first graph link type included in the first typed graph link is consistent with the requested graph link type;

wherein each digital asset is associated with a type mapping that is selected from a group consisting of reference-based mapping, structure-based mapping, and software tool-based mapping; and wherein each graph link type is selected from a group consisting of one-way digital asset dependencies, two-way digital asset dependencies, digital asset version relationships, digital asset aggregation relationships, and tool/digital asset dependencies.

2. The method of claim 1, wherein selecting the first graph node from the graph node processing set comprises:
selecting the first graph node from the graph node processing set in a breadth-first order.

3. The method of claim 1, wherein selecting the first graph node from the graph node processing set comprises:
selecting the first graph node from the graph node processing set in a depth-first order.

4. The method of claim 1, comprising:
determining if the graph node processing set is empty; and
repeating the steps of selecting and removing, comparing, determining, and adding for at least one additional graph node in response to the determination that the graph node processing set is not empty.

5. The method of claim 4, comprising:
determining a subgraph including the graph nodes associated with graph links consistent with the requested graph link type; and
providing the subgraph in response to the component request.

6. The method of claim 5, wherein the subgraph corresponds with a portion of the digital assets representing at least a portion of a component.

7. The method of claim 6, wherein the portion of the component includes one of a plurality of versions of the component.

8. The method of claim 6, wherein the portion of the component includes one of a plurality of variants of the component.

9. The method of claim 6, wherein the portion of the component includes one of a plurality of subcomponents of the component.

10. The method of claim 1, comprising:
performing an operation on at least a portion of the graph nodes includes in the graph node processing list.

11. The method of claim 1, wherein the digital assets includes digital asset data files.

12. The method of claim 1, wherein the digital assets includes digital asset database records.

13. The method of claim 1, wherein receiving a typed dependency graph representing digital assets comprises:
receiving a specification of the digital assets;
parsing the specification of the digital assets to identify digital asset relationships between the digital assets;
determining types for at least a portion of the identified digital asset relationships; and
assigning the types of the identified digital asset relationships to the typed graph links corresponding with the identified digital asset relationship.

14. A method of defining a component including a plurality of digital assets, the method comprising:
receiving a specification of digital assets;
receiving a set of graph link types defining a set of types of links between digital assets;
parsing the specification of digital assets to identify digital assets associated with a component;
creating graph nodes corresponding with the identified digital assets;
parsing the specification of digital assets to identify digital asset relationships between the identified digital assets;
classifying the identified digital asset relationships using the set of graph link types, such that each of the identified digital asset relationships is associated with at least one of the set of graph link types; and
creating, by operation of one or more computer processors, a typed dependency graph representing the component, wherein the typed dependency graph includes typed graph links connecting the graph nodes and corresponding with the identified digital asset links between the identified digital assets;
wherein the typed graph links are associated with the graph link types of their corresponding identified digital asset relationships;
wherein the typed dependency graph includes a root graph node representing the component and connected with a set of typed graph links associated with each of the set of graph link types;
wherein each digital asset is associated with a type mapping that is selected from a group consisting of reference-based mapping, structure-based mapping, and software tool-based mapping; and
wherein each graph link type within the set of graph link types is selected from a group consisting of one-way digital asset dependencies, two-way digital asset dependencies, digital asset version relationships, digital asset aggregation relationships, and tool/digital asset dependencies.

15. The method of claim 14, wherein the specification of digital assets includes digital asset data files.

16. The method of claim 14, wherein the specification of digital assets includes digital asset database records.

17. The method of claim 14, wherein a portion of the typed graph links specifies one of a plurality of versions of a component.

18. The method of claim 14, wherein a portion of the typed graph links specifies one of a plurality of variants of the component.

19. The method of claim 14, wherein a portion of the typed graph links specifies one of a plurality of subcomponents of the component.

20. A non-transitory computer-readable storage medium, including instructions that, when executed by a processor, cause the processor to define a component including a plurality of digital assets, by performing the steps of:
receiving a component request specifying at least one requested graph link type;
receiving a typed dependency graph representing digital assets, wherein the typed dependency graph includes graph nodes corresponding with the digital assets and includes typed graph links connecting the graph nodes, wherein each typed graph link includes one of plurality of graph link types representing a type of digital asset relationship between at least two of the digital assets;

adding at least one of the graph nodes to a graph node processing set;

selecting and removing a first graph node from the graph node processing set;

comparing at least a first typed graph link connected with the first graph node with the requested graph link type;

determining if a first graph link type included in the first typed graph link is consistent with the requested graph link type;

adding a second graph node connected with the first typed graph link to the graph node processing set in response to the determination that the first graph link type included in the first typed graph link is consistent with the requested graph link type;

wherein each digital asset is associated with a type mapping that is selected from a group consisting of reference relationships, structure relationships, and software tool relationships; and wherein each graph link type within the set of graph link types is selected from a group consisting of one-way digital asset dependencies, two-way digital asset dependencies, digital asset version relationships, digital asset aggregation relationships, and tool/digital asset dependencies.

21. The computer-readable storage medium of claim 20, wherein selecting the first graph node from the graph node processing set comprises:

selecting the first graph node from the graph node processing set in a breadth-first order.

22. The computer-readable storage medium of claim 20, wherein selecting the first graph node from the graph node processing set comprises:

selecting the first graph node from the graph node processing set in a depth-first order.

23. The computer-readable storage medium of claim 20, comprising:

determining if the graph node processing set is empty; and repeating the steps of selecting and removing, comparing, determining, and adding for at least one additional graph node in response to the determination that the graph node processing set is not empty.

* * * * *